(12) United States Patent
Lee et al.

(10) Patent No.: US 10,761,257 B2
(45) Date of Patent: Sep. 1, 2020

(54) DISPLAY DEVICE

(71) Applicant: SAMSUNG DISPLAY CO., LTD., Yongin-si, Gyeonggi-do (KR)

(72) Inventors: Kang-woo Lee, Seoul (KR); Donghoon Kim, Suwon-si (KR); Kyung-min Kim, Hwaseong-si (KR); Seunghwan Chung, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 492 days.

(21) Appl. No.: 15/493,536

(22) Filed: Apr. 21, 2017

(65) Prior Publication Data
US 2017/0371084 A1    Dec. 28, 2017

(30) Foreign Application Priority Data

Jun. 22, 2016    (KR) ......................... 10-2016-0078198

(51) Int. Cl.
*F21V 8/00*    (2006.01)
*G02B 6/00*    (2006.01)
*G02F 1/13357*    (2006.01)

(52) U.S. Cl.
CPC ............ *G02B 6/005* (2013.01); *G02B 6/00* (2013.01); *G02B 6/0051* (2013.01); *G02F 1/133603* (2013.01); *G02F 1/133606* (2013.01); *G02F 1/133609* (2013.01); *G02F 2001/133607* (2013.01); *G02F 2001/133614* (2013.01); *G02F 2001/133624* (2013.01);
(Continued)

(58) Field of Classification Search
None
See application file for complete search history.

(56) References Cited

U.S. PATENT DOCUMENTS

| 2008/0158907 A1* | 7/2008 | Lin ..................... G02B 6/005 362/606 |
| 2010/0187975 A1* | 7/2010 | Tsukahara ........... G02B 6/0038 313/503 |

(Continued)

FOREIGN PATENT DOCUMENTS

| JP | 2000-228111 A | 8/2000 |
| JP | 2002-243938 A | 8/2002 |

(Continued)

OTHER PUBLICATIONS

Machine translation of JP2009251511, Oct. 29, 2009 (Year: 2009).*
(Continued)

*Primary Examiner* — Britt D Hanley
(74) *Attorney, Agent, or Firm* — Kile Park Reed & Houtteman PLLC

(57) ABSTRACT

A display device includes a backlight and a display panel on the backlight. The backlight includes a light source to provide a first light, and an optical wavelength converter to receive the first light and emits a second light. The optical wavelength converter includes a light emitting part having a plurality of excitation light emitting bodies to be excited by receiving the first light, and thereby emit the second light, and a light absorbing part including a plurality of absorbers provided on the light emitting part to receive the second light and absorb a portion of the second light having a wavelength of about 550 nm to about 650 nm.

14 Claims, 11 Drawing Sheets

(52) U.S. Cl.
CPC .... *G02F 2201/08* (2013.01); *G02F 2203/055* (2013.01); *G02F 2203/68* (2013.01)

(56) References Cited

U.S. PATENT DOCUMENTS

| | | | | |
|---|---|---|---|---|
| 2011/0037953 | A1* | 2/2011 | Nizani | G02B 3/005 |
| | | | | 353/38 |
| 2012/0308792 | A1 | 12/2012 | Kawashima et al. | |
| 2014/0240952 | A1* | 8/2014 | Nakanishi | G02B 27/30 |
| | | | | 362/19 |
| 2014/0341241 | A1* | 11/2014 | Essaian | H01S 5/02415 |
| | | | | 372/34 |
| 2015/0378217 | A1* | 12/2015 | Kim | G02F 1/133524 |
| | | | | 349/71 |
| 2017/0017121 | A1* | 1/2017 | Park | G02F 1/133605 |
| 2017/0023720 | A1* | 1/2017 | Wang | G02B 6/005 |
| 2017/0097457 | A1* | 4/2017 | Park | G02B 6/0026 |
| 2017/0219759 | A1* | 8/2017 | Oh | G02B 6/0026 |
| 2017/0315283 | A1* | 11/2017 | Lee | G02B 6/0003 |
| 2019/0113664 | A1* | 4/2019 | Yoshikawa | G02B 5/20 |

FOREIGN PATENT DOCUMENTS

| | | |
|---|---|---|
| JP | 2005-183139 A | 7/2005 |
| JP | 2008-145548 A | 6/2008 |
| JP | 2009-251511 A | 10/2009 |
| JP | 2009-295541 A | 12/2009 |
| KR | 10-2003-0073257 A | 9/2003 |
| KR | 10-2006-0064434 A | 6/2006 |
| KR | 10-2013-0062865 A | 6/2013 |
| KR | 10-2014-0143060 A | 12/2014 |
| KR | 10-2015-0039300 A | 4/2015 |
| KR | 10-2015-0042640 A | 4/2015 |
| KR | 10-1581762 | 1/2016 |

OTHER PUBLICATIONS

Machine translation of JP2005183139A, Jul. 7, 2005 (Year: 2005).*
Yang, et al. "Full Visible Range Covering InP/ZnS Nanocrystals with High Photometric Performance and Their Application to White Quantum Dot Light-Emitting Diodes" Advanced Materials vol. 24 (2012) pp. 4180-4185.

* cited by examiner

DISPLAY DEVICE

CROSS-REFERENCE TO RELATED APPLICATION

Korean Patent Application No. 10-2016-0078198, filed on Jun. 22, 2016, in the Korean Intellectual Property Office, and entitled: "Display Device," is incorporated by reference herein in its entirety.

BACKGROUND

1. Field

Embodiments relate to a display device, and more particularly, to a display device capable of improving display quality.

2. Description of the Related Art

Display devices include liquid crystal display devices, plasma display devices, organic electroluminescent display devices, electroluminescence display devices, and electrophoretic display devices, etc. Liquid crystal display devices include non-emissive elements, which are incapable of self emission and thus require a separate light source. Recently, there is an emerging interest in technology that uses excitation light emitting bodies such as phosphors and quantum dots to improve the color and color reproduction rate of liquid crystal display devices.

SUMMARY

Embodiments are directed to a display device including a backlight and a display panel on the backlight. The backlight includes a light source to provide a first light, and an optical wavelength converter to receive the first light and emits a second light. The optical wavelength converter includes a light emitting part having a plurality of excitation light emitting bodies to be excited by receiving the first light, and thereby emit the second light, and a light absorbing part including a plurality of absorbers provided on the light emitting part to receive the second light and absorb a portion of the second light having a wavelength of about 550 nm to about 650 nm.

The first light may be a blue light. The excitation light emitting bodies may include a red excitation light emitting body to receive the first light and emit a red light, and a green excitation light emitting body to receive the first light and emit a green light.

The excitation light emitting bodies may include at least one of a boron-dipyrromethene based compound, a coumarin based compound, a rhodamine based compound, a perylene based compound, a nitride compound, or a silicate compound.

The absorbers include at least one of a tetraaza porphyrin based compound, a rhodamine based compound, a squarine based compound, or a cyanine based compound.

The optical wavelength converter may further include a base part between the light emitting part and the light absorbing part.

The optical wavelength converter further may include a diffusion part on the light absorbing part to diffuse light.

The optical wavelength converter may further include a blocking prevention part below the light emitting part.

The backlight may further include a light guide plate below the optical wavelength converter. The light source may be on at least a side surface of the light guide plate.

The backlight may further include a diffusion plate below the optical wavelength converter, the light source being provided below the diffusion plate.

The backlight may further includes an optical member between the optical wavelength converter and the display panel, the optical member including at least one of a prism sheet, a diffusion sheet, or a protective sheet.

Embodiments are also directed to a display device, including a backlight and a display panel on the backlight. The backlight includes a light guide plate, a light source on at least a side surface of the light guide plate, the light source to provide a first light to the light guide plate, and a light absorbing sheet having a plurality of absorbers. The light guide plate includes a plurality of excitation light emitting bodies to be excited by receiving the first light, and thereby emit a second light. The absorbers to receive the second light from the light guide plate and absorb a portion of the second light having a wavelength of about 550 nm to about 650 nm.

The light absorbing sheet may include a blocking prevention part to prevent the light absorbing sheet from pressing against the light guide plate and a light absorbing part on the blocking prevention part, the light absorbing part including the absorbers.

The light absorbing sheet may further include a diffusion part to diffuse light, the diffusion part being provided on the light absorbing part.

The first light may be a blue light. The second light may include a red light and a green light.

Embodiments are also directed to a display device including a backlight and a display panel provided on the backlight. The backlight includes a light source, a diffusion plate on the light source, the diffusion plate to receive a first light from the light source, the diffusion plate including a plurality of excitation light emitting bodies to be excited when the first light is incident theron, and thereby emit the second light, and a light absorbing sheet having a plurality of absorbers that are provided with the second light from the diffusion plate to absorb a portion of the second light having a wavelength of about 550 nm to about 650 nm.

The light absorbing sheet may include a blocking prevention part to prevent the light absorbing sheet from pressing against the diffusion plate, and a light absorbing part on the blocking prevention part, the light absorbing part including the absorbers.

The light absorbing sheet may further include a diffusion part to diffuse light, the diffusion part being on the light absorbing part.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
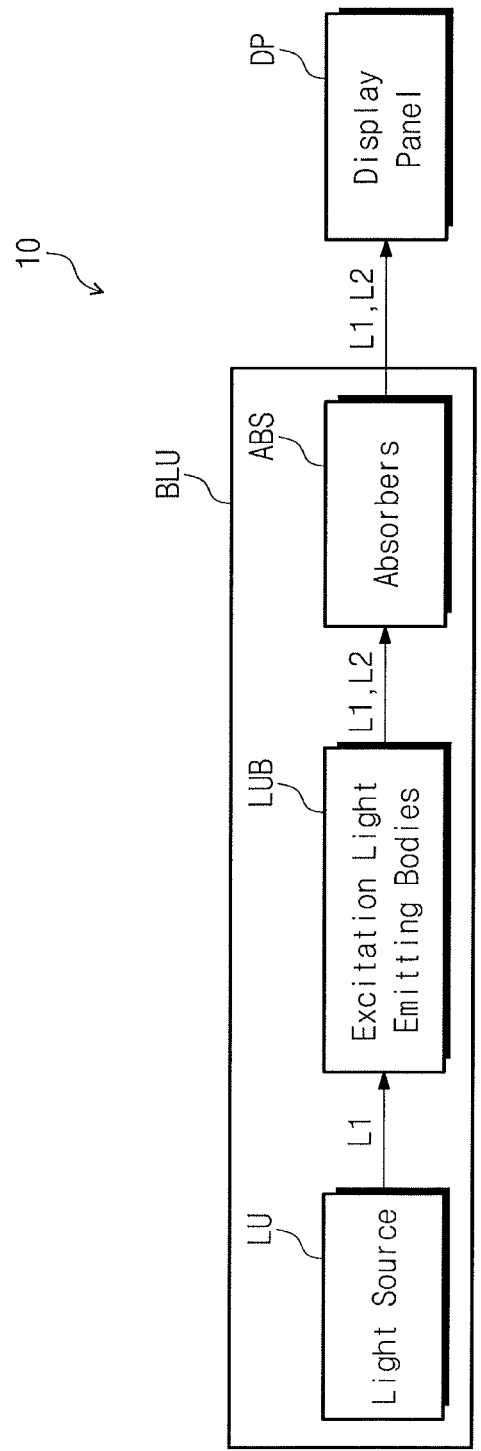
FIG. 1 illustrates a block diagram schematically depicting a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

FIG. 1 illustrates a block diagram schematically depicting a display device according to an embodiment.

Referring to FIG. 1, a display device 10 according to an embodiment includes a backlight BLU and a display panel DP provided on the backlight BLU. The backlight BLU includes a light source LU, a plurality of excitation light emitting bodies LUB, and a plurality of absorbers ABS.

The light source LU provides a first light L1 to the excitation light emitting bodies LUB. The excitation light emitting bodies LUB may be excited by being provided with the first light L1, and thereby may emit a second light L2. The absorbers ABS absorb a portion of the second light L2 having a wavelength of about 550 nm to about 650 nm. The first light L1 and the second light L2 not absorbed by the absorber ABS, that is, the second light L2 exclusive of the wavelength range from 550 nm to 650, are provided to the display panel DP.

Figure 2A:
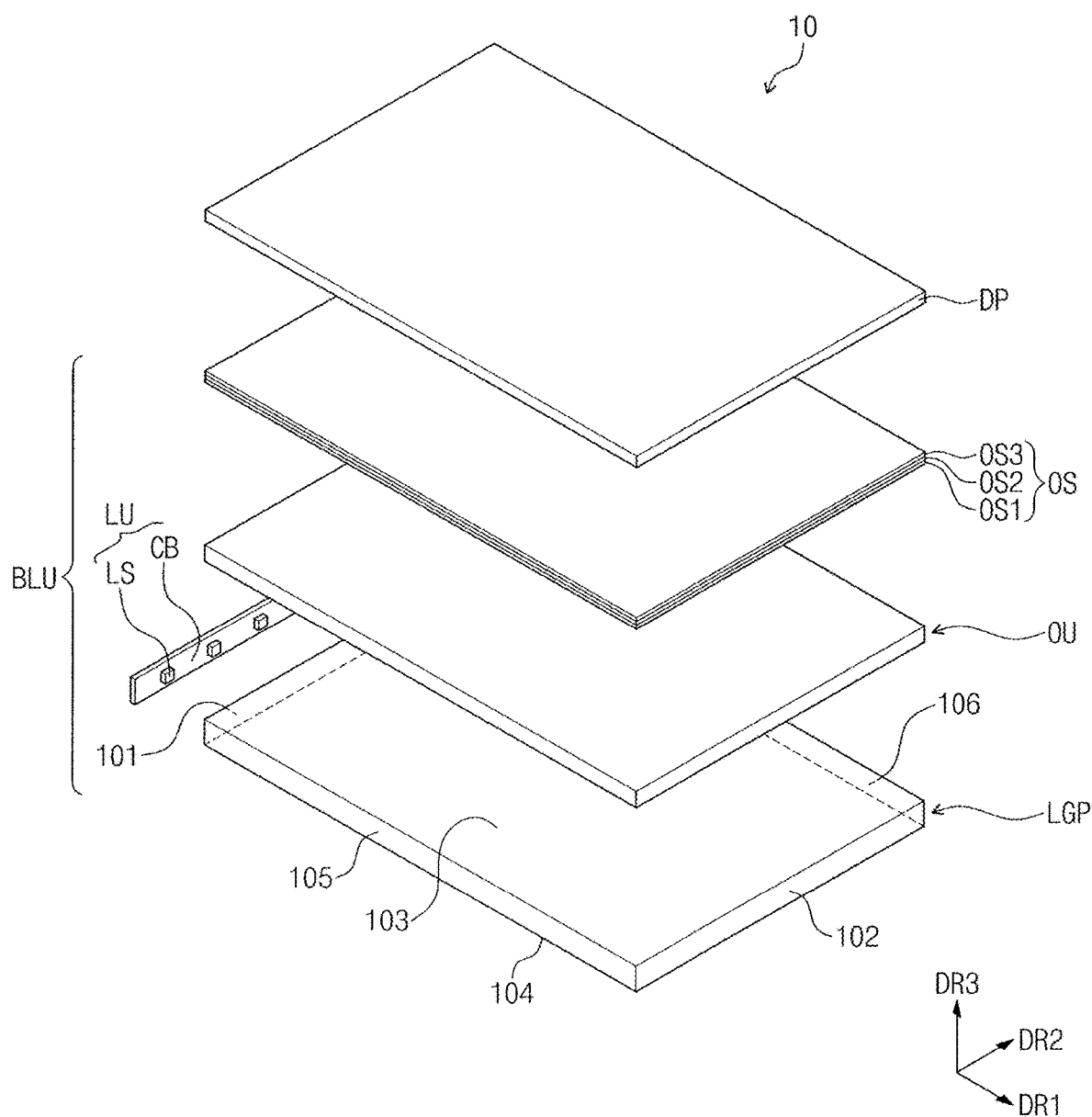
FIGS. 2A and 2B illustrate exploded perspective views schematically depicting a display device according to an embodiment.
Figure 2B:
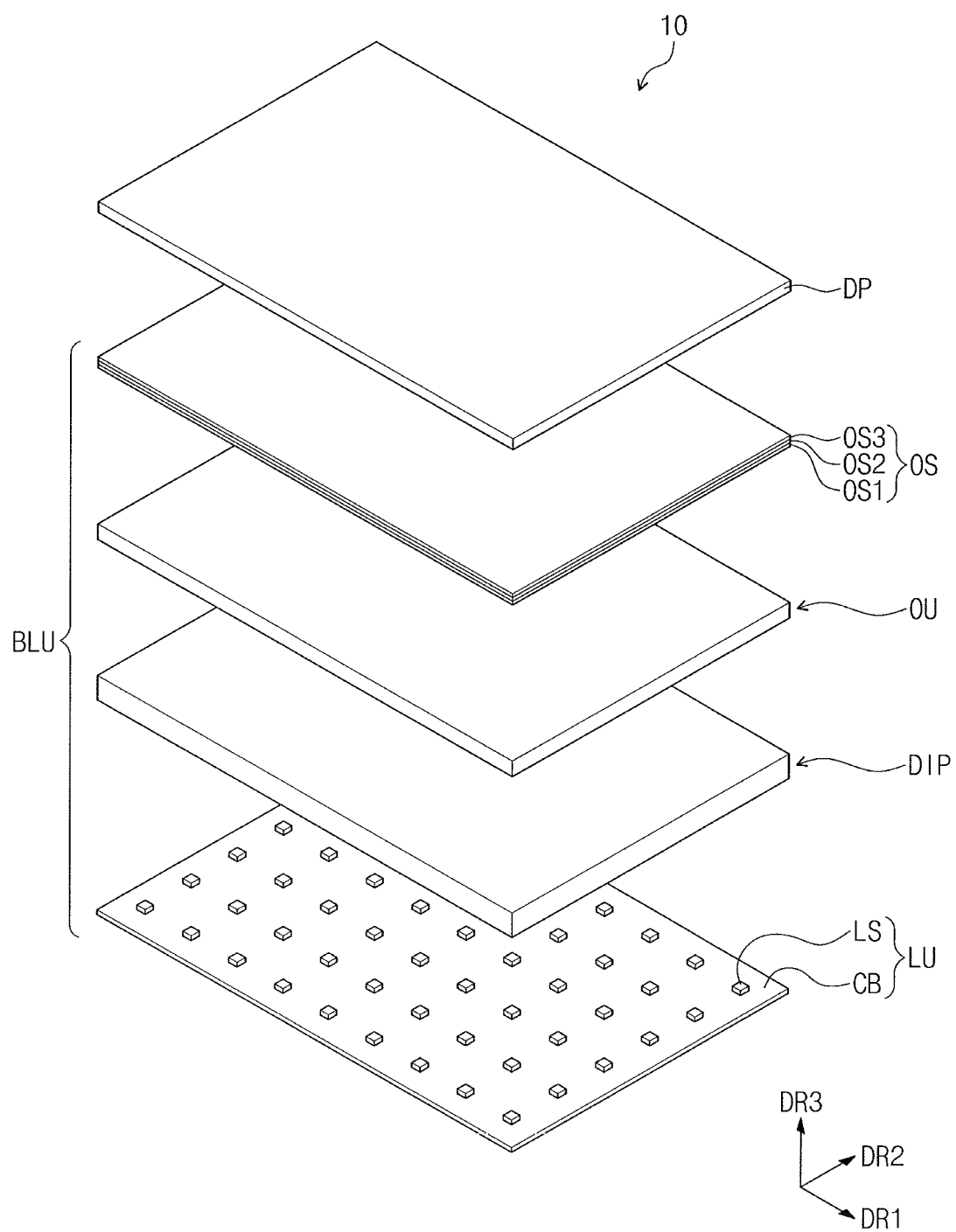

FIGS. 2A and 2B illustrate exploded perspective views schematically depicting a display device according to an embodiment.

Referring to FIGS. 1, 2A, and 2B, a backlight BLU and a display panel DP may be laminated in a third direction DR3 intersecting a first direction DR1 and a second direction DR2.

The display panel DP may be disposed on the backlight BLU. The display panel DP may be provided with light and may display an image. The display panel DP may be a light receiving type display. The display panel DP may be one of a variety of display panels, such as a liquid crystal display panel, a plasma display panel, an electrophoretic display panel, a microelectromechanical system (MEMS) display panel, or an electrowetting display panel. The display panel DP according to an embodiment may be exemplarily described as a liquid crystal display panel.

The liquid crystal display panel may be a panel in one of a vertical alignment mode (VA), a patterned vertical alignment mode (PVA), an in-plane switching mode (IPS), a fringe-field switching mode (FFS), or a plane to line switching mode (PLS), as examples.

The backlight BLU may provide light to the display panel DP. The backlight BLU may include a light source LU and an optical wavelength converter OU. The light source LU may provide a first light L1 to the optical wavelength converter OU. For example, the light source LU may provide a blue light. The light source LU may include at least one light emitter LS, and a circuit board CB on which the light emitter LS is disposed and which applies power to the light emitter LS. The light emitter LS may be, for example, a light emitting diode (LED). There may a plurality of the light emitters LS. The light emitters LS may be spaced apart in the second direction DR2 and provided on the circuit board CB. The light emitters LS may provide, for example, blue light.

The optical wavelength converter OU may be provided with the first light L1 from the light source and may emit a second light L2. For example, the first light L1 may be a blue light, and the second light L2 may include a red light and a green light. The optical wavelength converter OU may absorb a portion of the second light L2 having a wavelength of about 550 nm to about 650 nm. The optical wavelength converter OU will be described below in greater detail.

The backlight BLU may further include an optical sheet OS. The optical sheet OS may enhance the brightness and viewing angle of light provided to the display panel DP. The optical sheet OS may include a first optical sheet OS1, a second optical sheet OS2, and a third optical sheet OS3 that are sequentially laminated.

The first optical sheet OS1 may be, for example, a prism sheet that collects light in a direction perpendicular to a plane of the display panel DP. The second optical sheet OS2 may be, for example, a diffusion sheet that diffuses light provided to the display panel DP. In some implementations, the second optical sheet OS2 may be, for example, a reflection polarization sheet that reflects and polarizes light provided to the display panel DP. The third optical sheet OS3 may be, for example, a protective sheet protecting the prism sheet and the diffusion sheet from external impact. The optical sheet OS may be obtained by overlapping several layers of at least one of the first optical sheet OS1, the second optical sheet OS2, or the third optical sheet OS3. In some implementations, at least one of the sheets may be omitted as desired.

The display device 10 according to an embodiment may further include a bottom chassis. The bottom chassis may be located below the backlight BLU. The bottom chassis may store components of the backlight BLU and the display panel DP.

The display device 10 according to an embodiment may further include a mold frame. The mold frame may be provided between the display panel DP and the backlight BLU. The mold frame may be provided along the edge of the display panel DP. The mold frame may support the display panel DP from below the display panel DP. The mold frame may be independent of the bottom chassis. In some implementations, the mold frame may be integrated with the bottom chassis.

Referring to FIG. 2A, the display device 10 according to an embodiment may include an edge-type light source. The backlight BLU may further include a light guide plate LGP. The light guide plate LGP may be provided below the display panel DP. The light guide plate LGP may have, for example, a long side oriented in the first direction DR1 and a short side oriented in the second direction DR2 intersecting the first direction DR1.

The light guide plate LGP may guide light while emitting light provided from the light source LU. The light guide plate LGP may guide light provided from the light source in a direction toward the display panel DP. Light that is incident inside of the light guide plate LGP may be emitted in the direction of the display panel DP through a light emission surface 103 of the light guide plate LGP. The light guide plate LGP may include a light incidence surface 101, a light facing surface 102, the light emission surface 103, a rear surface 104, a first side surface 105, and a second side surface 106.

The light incidence surface 101 may be provided with light from the light source LU. The light incidence surface 101 may be disposed adjacent to the light source LU. The light incidence surface 101 may be connected to the light emission surface 103, the rear surface 104, the first side surface 105, and the second side surface 106. The light incidence surface 101 may face the light facing surface 102.

The light facing surface 102 may face the light incidence surface 101. The light facing surface 102 may be, for example, spaced apart in the first direction DR1 from the light incidence surface 101. The light facing surface 102 may be connected to the light emission surface 103, the rear surface 104, the first side surface 105, and the second side surface 106.

The light emission surface 103 may emit light provided from the light incidence surface 101. The light emission surface 103 may be disposed adjacent to the display panel DP. The light emission surface 103 may be connected to the light incidence surface 101, the light facing surface 102, the first side surface 105, and the second side surface 106. The light emission surface 103 may face the rear surface 104.

The rear surface 104 may face the light emission surface 103. The rear surface 104 may be, for example, spaced apart in the third direction DR3 from the light emission surface 103. The rear surface 104 may be connected to the light incidence surface 101, the light facing surface 102, the first side surface 105, and the second side surface 106.

The first side surface 105 may be connected to the light incidence surface 101, the light facing surface 102, the light emission surface 103, and the rear surface 104. The second side surface 106 may be spaced apart in the second direction DR2 from the first side surface 105. The second side surface 106 may be connected to the incidence light surface 101, the light facing surface 102, the light emission surface 103, and the rear surface 104.

A suitable light guide plate LGP may be used. The light guide plate LGP may include, for example, a polymer resin or a glass. The polymer resin may be, for example, a transparent polymer resin such as polycarbonate, polymethyl methacrylate, polydimethylsiloxane, polystyrene, or methacrylate styrene, etc.

The light guide plate LGP may include optical patterns. The optical patterns may totally reflect light. The optical patterns may be disposed, for example, on at least one of the light emission surface 103 or the rear surface 104 facing the light emission surface 103.

The backlight BLU may further include a reflection sheet. The reflection sheet may be provided below the light guide plate LGP. The reflection sheet may reflect light that is leaked in a direction away from the display panel DP, thereby changing the path of the light such that the light progresses toward the display panel DP. Accordingly, the reflection sheet may increase the amount of light provided toward the display panel DP.

Although the light source LU is exemplarily illustrated in FIG. 2A as being disposed on the side surface having a shorter width among the side surfaces of the light guide plate LGP, in some implementations, the light source LU may be disposed on the side surface having a longer width among the side surfaces of the light guide plate LGP.

Although the light source LU is exemplarily illustrated in FIG. 2A as being provided so as to correspond to only one of the side surfaces of the light guide plate LGP, in some implementations, a plurality of the light sources LU may also be disposed along the other side surfaces of the light guide plate LGP.

Referring to FIG. 2B, the display device 10 according to an embodiment may include a direct-type light source LU. The backlight BLU may further include a diffusion plate DIP. The diffusion plate DIP may receive light from the light source LU and may provide light to the display panel DP. The light source LU may be located below the diffusion plate DIP. The optical wavelength converter OU may be located between the diffusion plate DIP and the light source LU. In some implementations, the diffusion plate DIP may be omitted.

FIGS. 3A to 3D illustrate cross-sectional views schematically depicting an optical wavelength converter OU included in a display device according to an embodiment.

Referring to FIGS. 1 and 3A to 3D, the optical wavelength converter OU may include a light emitting part LUP and a light absorbing part ASP. As described above, the optical wavelength converter OU may be provided with the first light L1 from the light source LU and may emit the second light L2. The optical wavelength converter OU may absorb a portion of the second light L2 having a wavelength of about 550 nm to about 650 nm. The optical wavelength converter OU may be formed through, for example, UV curing, thermal curing, or extrusion.

The light emitting part LUP may include a first resin RE1 and excitation light emitting bodies LUB. A general resin may be used as the first resin RE1. In some implementations, the first resin RE1 may include, for example, a silicone resin or a photoresist resin. The first resin RE1 may include, for example, at least one of a monomer or an oligomer. The first resin RE1 may be, for example, at least one of a polyester based resin, a polyurethane based resin, an acrylic based resin, a vinyl based resin, or a mixture thereof. In the disclosure, "a based resin" may indicate that "~" is included in the structure of the resin.

The excitation light emitting bodies LUB may be excited by being provided with the first light L1, and thereby, may emit the second light L2. The excitation light emitting bodies LUB exclude quantum dots. The excitation light emitting bodies LUB may include, for example, at least one of a boron-dipyrromethene (BODIPY) based compound, a coumarin based compound, a rhodamine based compound, a perylene based compound, a nitride compound, or a silicate compound. In the disclosure, "a based compound" may indicate that "~" is included in the structure of the compound.

A general boron-dipyrromethene (BODIPY) based compound may be used. The boron-dipyrromethene (BODIPY) based compound may be selected from, for example, the following Compound Group 1.

[Compound Group 1]

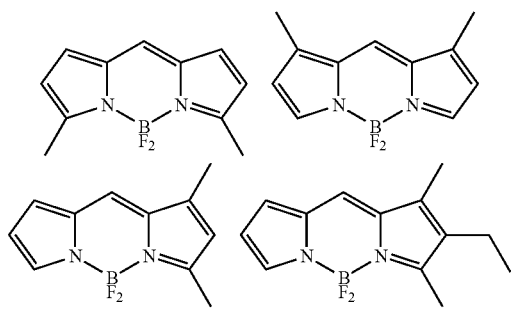

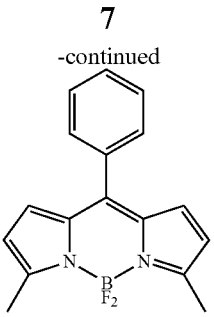

A general coumarin based compound may be used. The coumarin based compound may be, for example, 3-(6-methylbenzo[d]thiazol-2-yl)-7-(pentan-3-yl)-2H-chromen-2-one.

A general rhodamine based compound may be used. The rhodamine based compound may be, for example, (2-(2-(4-methoxystyryl)-6-methyl-4H-pyran-4-ylidene)malononitrile).

The excitation light emitting bodies LUB may include a red excitation light emitting body LUB1 and a green excitation light emitting body LUB2. The red excitation light emitting body LUB1 may be excited by being provided with the first light L1, and thereby may emit a red light. The green excitation light emitting body LUB2 may be excited by being provided with the first light L1, and thereby may emit a green light.

The light absorbing part ASP may be located on the light emitting part LUP. The light absorbing part ASP may include a second resin RE2 and absorbers ABS. A general resin may be used as the second resin RE2. The second resin RE2 may include, for example, a silicone resin or a photoresist resin. The second resin RE2 may include at least one of, for example, a monomer or an oligomer. The second resin RE2 may be at least one of, for example, a polyester based resin, a polyurethane based resin, an acrylic based resin, a vinyl based resin, or a mixture thereof.

The absorbers ABS may be receive the second light L2 and may absorb a portion of the second light L2 having a wavelength of about 550 nm to 650 nm. General absorbers may be used as the absorbers ABS. The absorbers ABS may include at least one of, for example, a tetraaza porphyrin (TAP) based compound, a rhodamine (RH) based compound, a squarine (SQ) based compound, or a cyanine (CY) based compound.

Figure 3A:
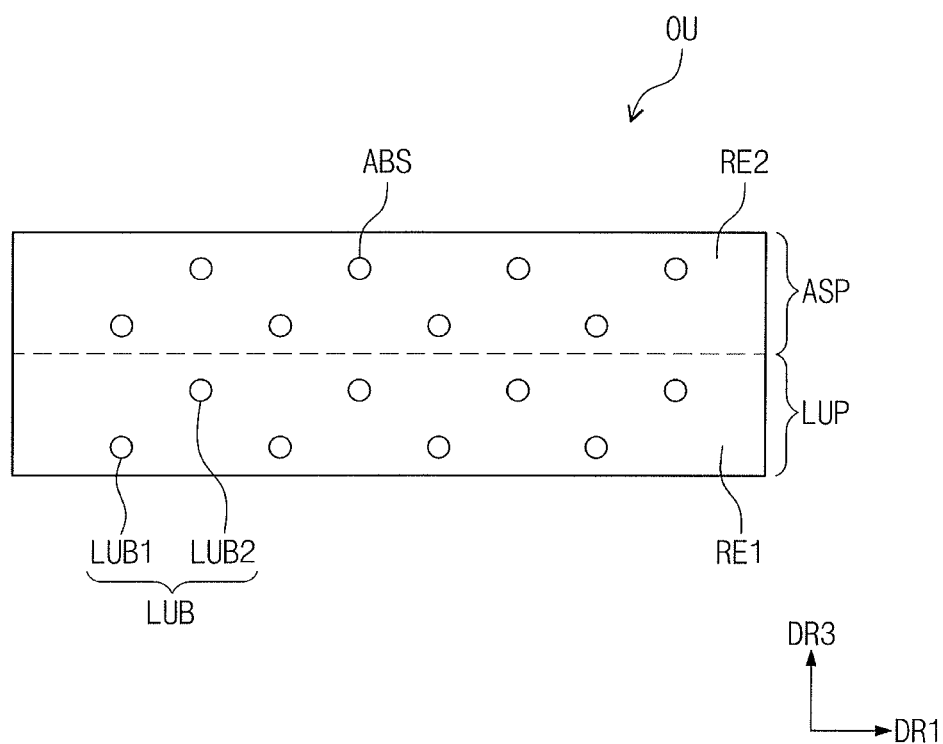
FIGS. 3A to 3D illustrate cross-sectional views schematically depicting an optical wavelength converter included in a display device according to an embodiment.
Figure 3B:
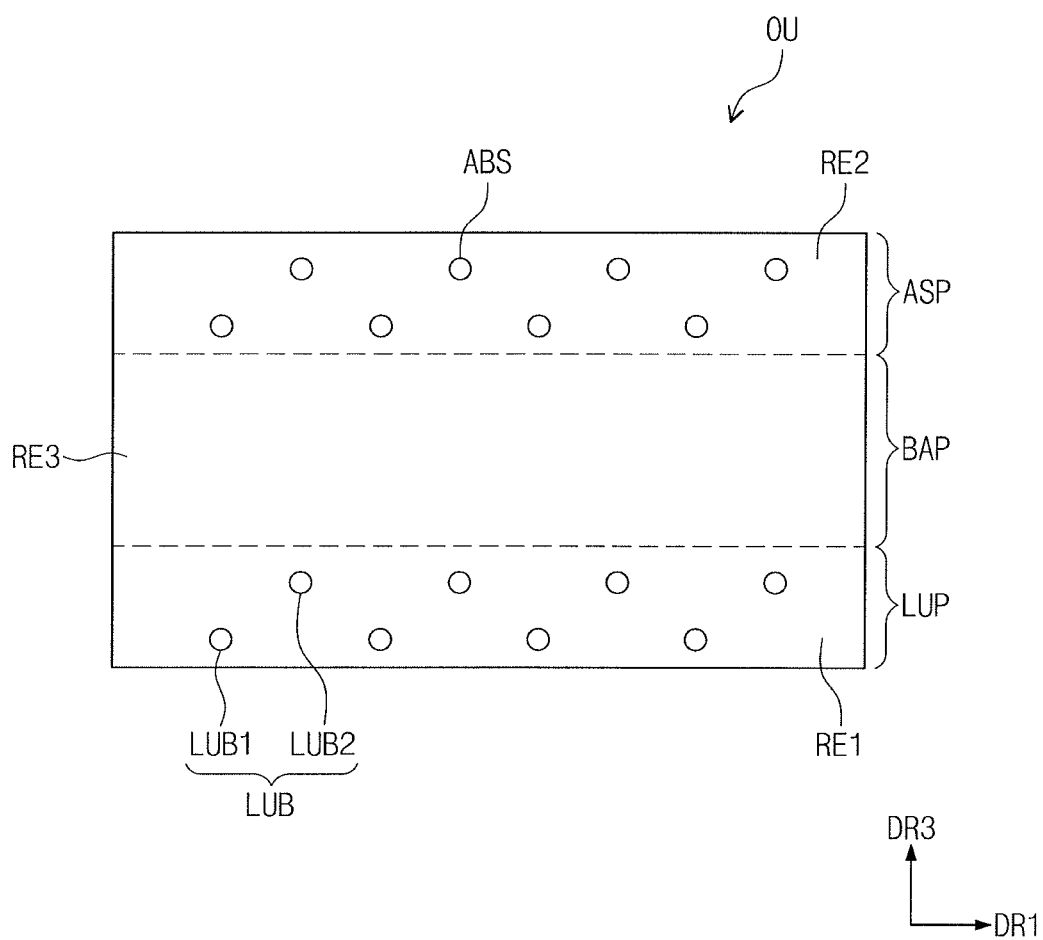

Referring to FIG. 3B, the optical wavelength converter OU may further include a base part BAP. The base part BAP may be located between the light emitting part LUP and the light absorbing part ASP. The base part BAP may include a third resin RE3. A general resin may be used as the third resin RE3. The third resin RE3 may include, for example, a silicone resin or a photoresist resin. The third resin RE3 may include at least one of, for example, a monomer or an oligomer. The third resin RE3 may be at least one of, for example, a polyester based resin, a polyurethane based resin, an acrylic based resin, a vinyl based resin, or a mixture thereof.

Figure 3C:
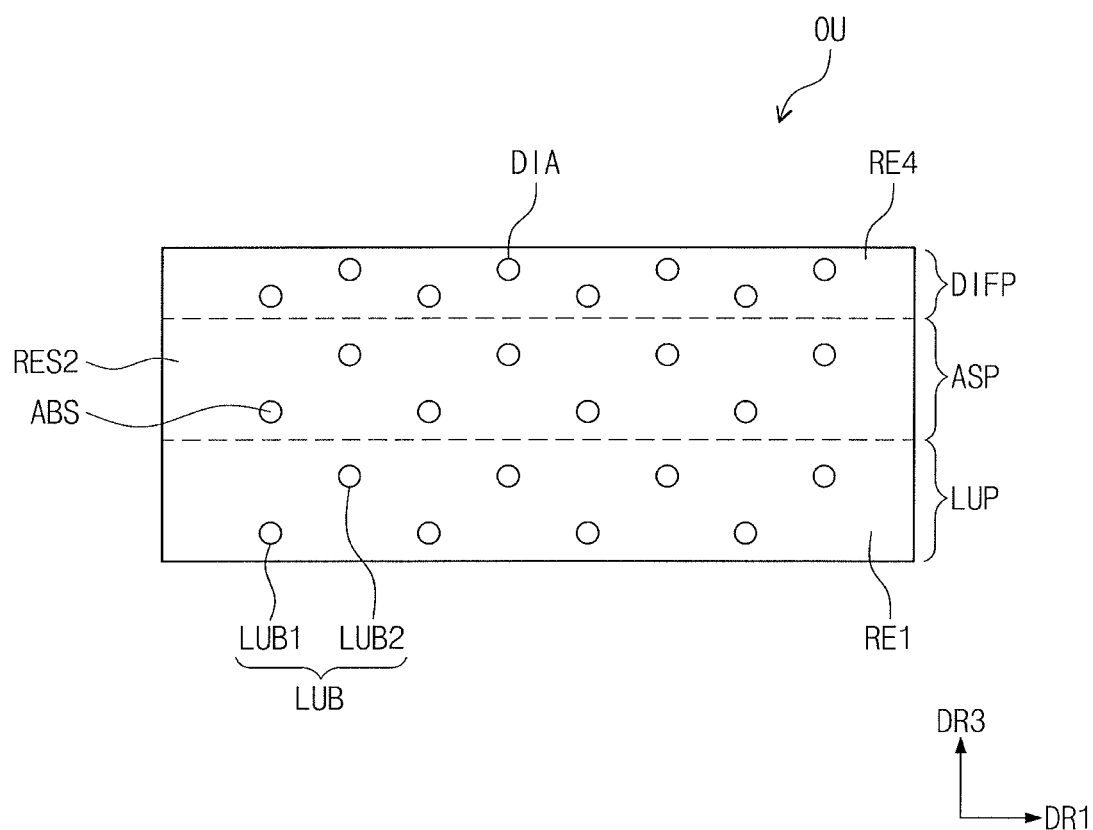

Referring to FIG. 3C, the optical wavelength converter OU may further include a diffusion part DIFP. The diffusion part DIFP may be located on the light absorbing part ASP. The diffusion part DIFP may diffuse light provided thereto. The diffusion part DIFP may include a fourth resin RE4 and diffusers DIA. A general resin may be used as the fourth resin RE4. The fourth resin RE4 may include, for example, a silicone resin or a photoresist resin. The fourth resin RE4 may include at least one of, for example, a monomer or an oligomer. The fourth resin RE4 may be at least one of, for example, a polyester based resin, a polyurethane based resin, an acrylic based resin, a vinyl based resin, or a mixture thereof.

The diffusers DIA may diffuse the light provided thereto. General diffusers may be used as the diffusers DIA. The diffusers DIA may include at least one of, for example, an acrylic, polymethyl methacrylate (PMMA), polystyrene (PS), modified styrene (MS), polyurethane (PU), or silicone.

Figure 3D:
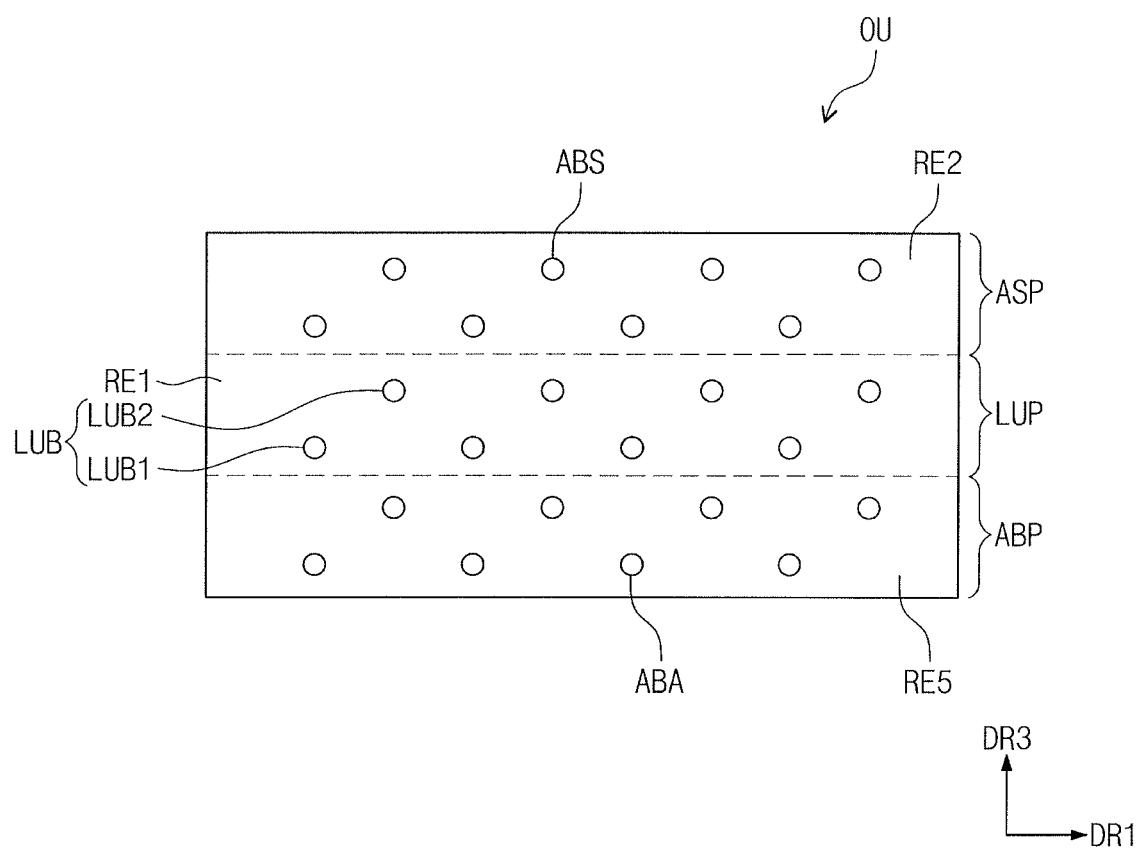

Referring to FIG. 3D, the optical wavelength converter OU may further include a blocking prevention part ABP. The blocking prevention part ABP may be located below the light emitting part LUP. The blocking prevention part ABP may prevent a member (for example, the light guide plate or the diffusion plate) that is located below the optical wavelength converter OU from pressing against the optical wavelength converter OU. For example, the blocking prevention part ABP may keep the remainder of the optical wavelength converter OU from being in contact with another member. The blocking prevention part ABP may include a fifth resin RE5 and blocking preventers ABA. A general resin may be used as the resin RE5. The fifth resin RE5 may include, for example, a silicone resin or a photoresist resin. The fifth resin RE5 may include at least one of, for example a monomer or an oligomer. The fifth resin RE5 may be at least one of, for example, a polyester based resin, a polyurethane based resin, an acrylic based resin, a vinyl based resin, or a mixture thereof.

The blocking preventers ABA may prevent a member (for example, the light guide plate or the diffusion plate) located below the optical wavelength converter OU from pressing against the remaining portions of the optical wavelength converter OU. General blocking preventers may be used as the blocking preventers ABA. The blocking preventers ABA may include at least one of, for example, acrylic, polymethyl methacrylate (PMMA), polystyrene (PS), modified styrene (MS), polyurethane (PU), or silicone.

Figure 4A:
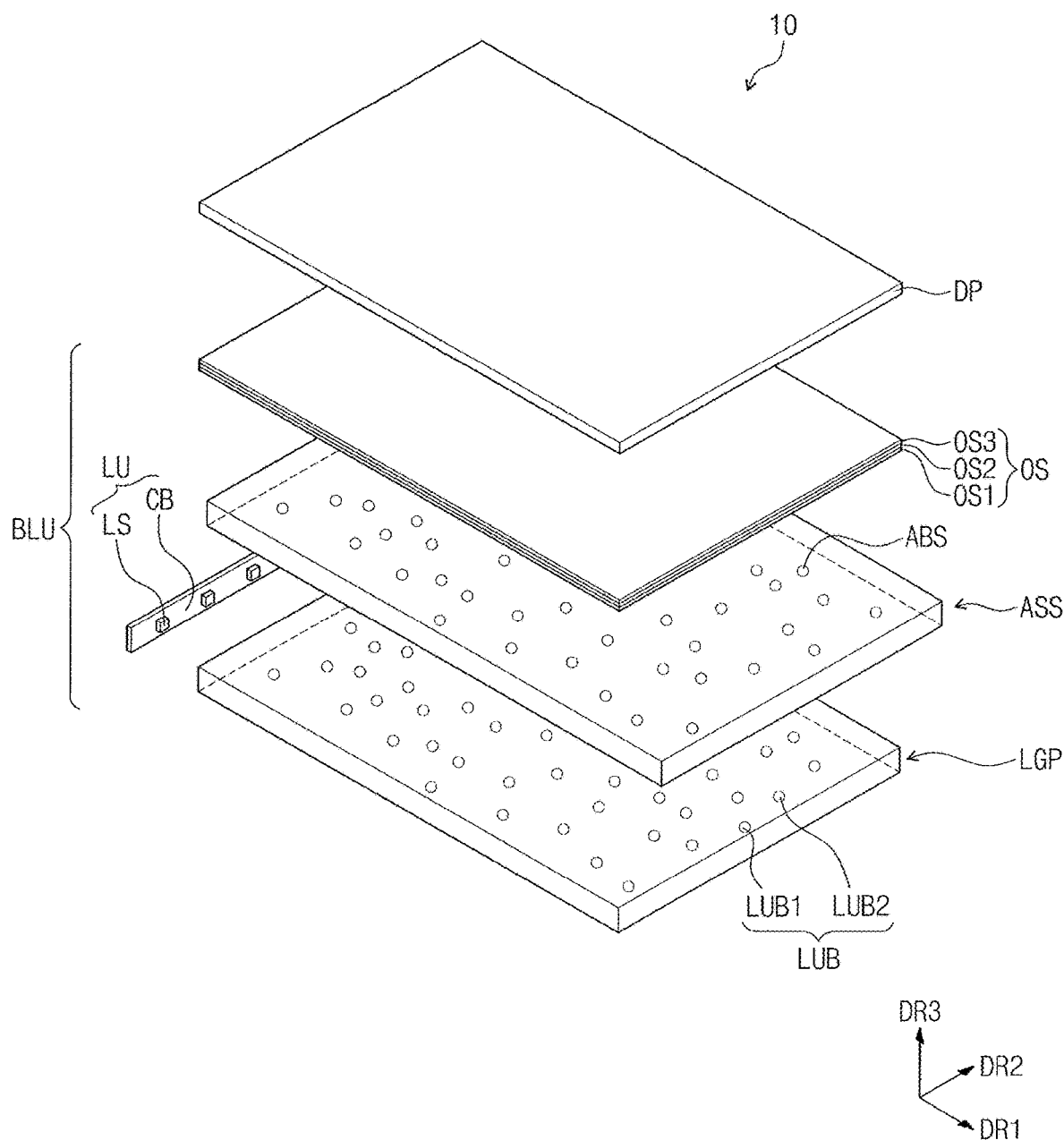
FIGS. 4A and 4B illustrate exploded perspective views schematically depicting a display device according to an embodiment.
Figure 4B:
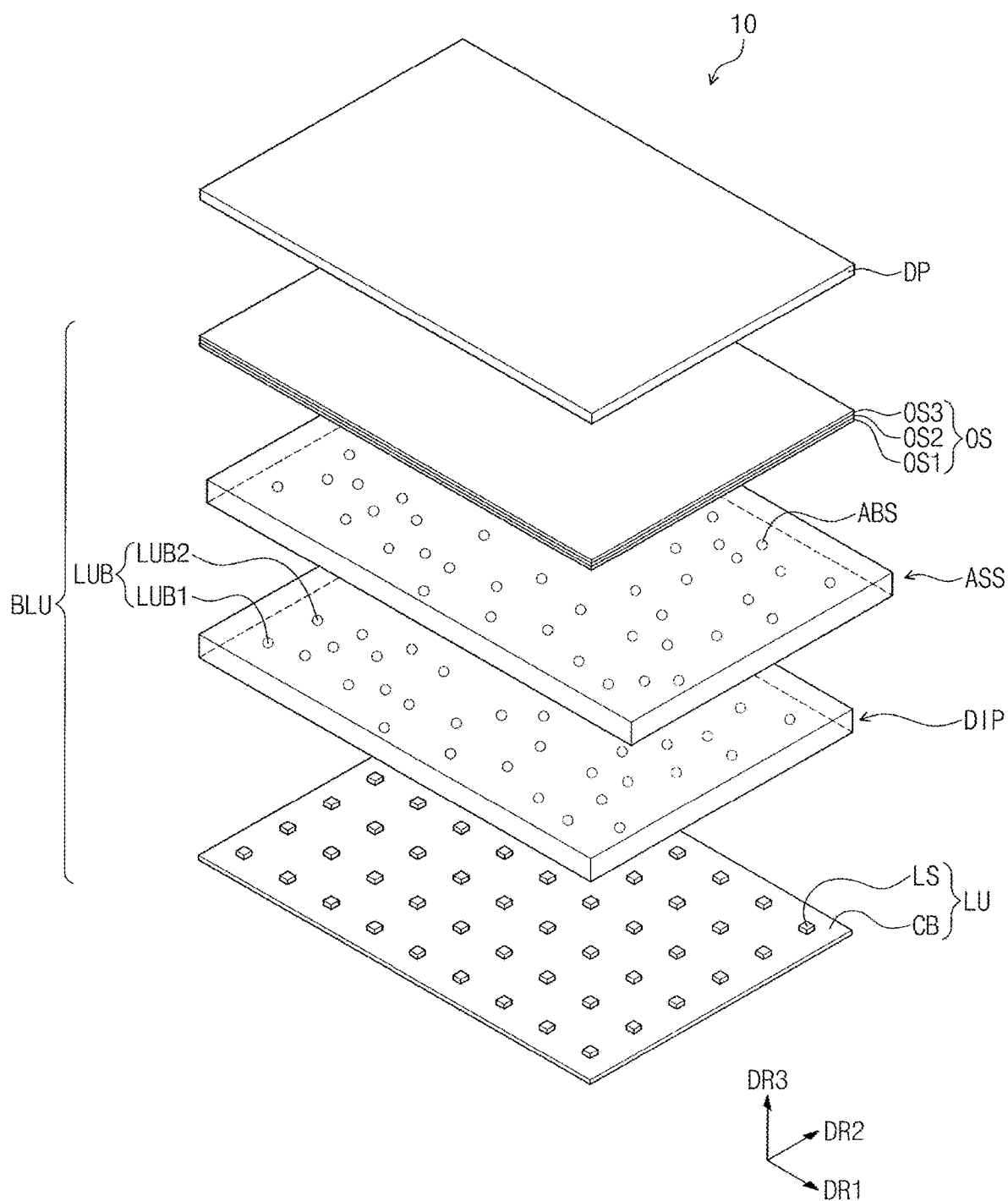

FIGS. 4A and 4B illustrate exploded perspective views depicting a display device according to an embodiment.

Hereinafter, a display device according to an embodiment is described with reference to FIGS. 4A and 4B. Hereinafter, description is given with a focus on differences with respect to the display device described above and illustrated in FIGS. 2A and 2B. Parts that are the same as those in the above-described display device illustrated in FIGS. 2A and 2B may be understood by referring to the description with respect to FIGS. 2A and 2B.

Referring to FIGS. 4A and 4B, a display device according to an embodiment includes a backlight BLU and a display panel DP. The display panel DP is provided on the backlight BLU. The backlight BLU includes a light source LU and a light absorbing sheet ASS. The light source LU may include at least one light emitter LS, and a circuit board CB on which the light emitter LS is disposed and which supplies power to the light emitter LS.

Although the light source LU is exemplarily illustrated in FIG. 4A as being disposed on the side surface having a shorter width among the side surfaces of the light guide plate LGP, in some implementations, the light source LU may be disposed on the side surface having a longer width among the side surfaces of the light guide plate LGP.

Although the light source LU is exemplarily illustrated in FIG. 4A as being provided so as to correspond to only one of the side surfaces of the light guide plate LGP, tin some implementations, a plurality of the light sources LU may be disposed along the other side surfaces of the light guide plate LGP.

Referring to FIGS. 1 and 4A, the backlight BLU may further include a light guide plate LGP. The light guide plate LGP may guide the light while emitting the light provided from the light source LU. The light guide plate LGP may guide the light provided from the light source LU in the direction of the display panel DP. The light source LU may be provided on at least one side surface of the light guide plate LGP and may provides a first light L1 to the light guide plate LGP.

A general light guide plate LGP may be used. The light guide plate LGP may include, for example, a polymer resin or a glass. The polymer resin may be, for example, a transparent polymer resin such as polycarbonate, polymethyl methacrylate, polydimethylsiloxane, polystyrene, or methacrylate styrene, etc.

The light guide plate LGP may include a plurality of excitation light emitting bodies LUB. The excitation light emitting bodies LUB may be randomly arranged in the polymer resin or glass. The excitation light emitting bodies LUB may be excited by receiving the first light from the light source LU, and thereby may emit a second light L2.

The excitation light emitting bodies LUB exclude quantum dots The excitation light emitting bodies LUB may include, for example, at least one of a boron-dipyrromethene (BODIPY) based compound, a coumarin based compound, a rhodamine based compound, a perylene based compound, a nitride compound, or a silicate compound.

The excitation light emitting bodies LUB may include a red excitation light emitting body LUB1 and a green excitation light emitting body LUB2. The red excitation light emitting body LUB1 may be excited by receiving the first light L1, and thereby may emit a red light. The green excitation light emitting body LUB2 may be excited by receiving the first light L1, and thereby may emit a green light.

A light absorbing sheet ASS may include a plurality of light absorbers ABS. The light absorbers ABS may receive the second light L2 and may absorb a portion of the second light L2 having a wavelength of about 550 nm to 650 nm. The light absorbing sheet ASS will be described below in greater detail.

Referring to FIGS. 1 and 4B, the backlight BLU may further include a diffusion plate DIP. The diffusion plate DIP may receive light from the light source LU and provide light to the display panel DP. The light source LU may be located below the diffusion plate DIP.

The diffusion plate DIP may include a plurality of light excitation bodies LUB. The excitation light emitting bodies LUB may be randomly arranged in the polymer resin or glass. The excitation light emitting bodies LUB may be excited by receiving the first light from the light source LU, and thereby may emit the second light L2.

The excitation light emitting bodies LUB exclude quantum dots. The excitation light emitting bodies LUB may include, for example, at least one of a boron-dipyrromethene (BODIPY) based compound, a coumarin based compound, a rhodamine based compound, a perylene based compound, a nitride compound, or a silicate compound.

The excitation light emitting bodies LUB may include a red excitation light emitting body LUB1 and a green excitation light emitting body LUB2. The red excitation light emitting body LUB1 may be excited by receiving the first light L1, and thereby may emit a red light. The green excitation light emitting body LUB2 may be excited by receiving the first light L1, and thereby may emit a green light.

A light absorbing sheet ASS includes a plurality of light absorbers ABS. The light absorbers ABS receive the second light L2 and absorb a portion of the second light L2 having a wavelength of about 550 nm to 650 nm. The light absorbing sheet ASS will be described below in greater detail.

Figure 5A:
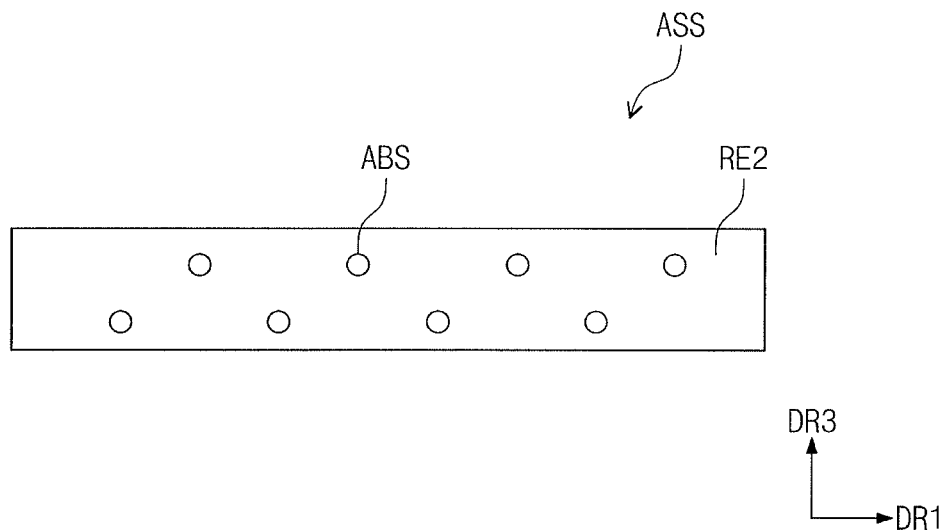
FIGS. 5A to 5C illustrate cross-sectional views schematically depicting an optical wavelength converter included in a display device according to an embodiment.
Figure 5B:
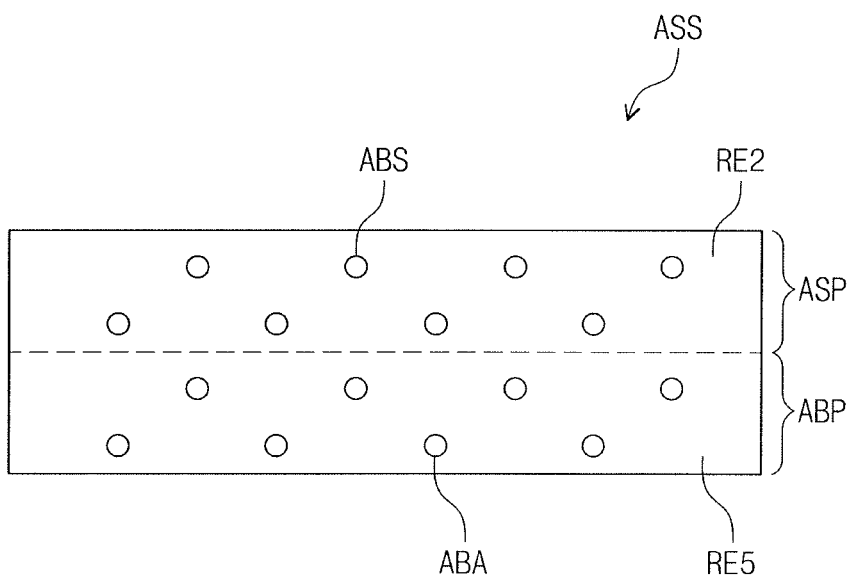
Figure 5C:
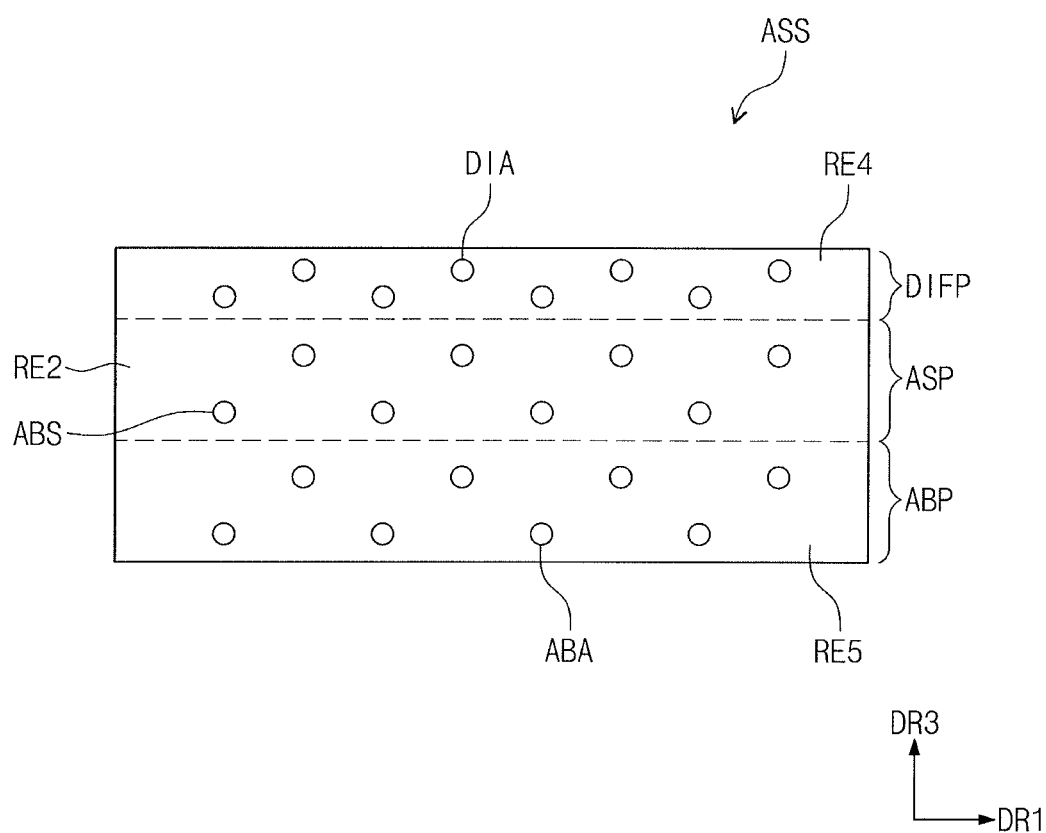

FIGS. 5A to 5C are cross-sectional views schematically illustrating an optical wavelength converter included in a display device according to an embodiment.

Referring to FIGS. 1 and 5A to 5C, a light absorbing sheet ASS absorbs a portion of the second light L2 having a wavelength of about 550 nm to about 650 nm. The light absorbing sheet ASS may include a second resin RE2 and absorbers ABS. A general resin may be used as the second resin RE2. The second resin RE2 may include, for example, a silicone resin or a photoresist resin. The second resin RE2 may include at least one of, for example, a monomer or an oligomer.

The absorbers ABS may be receive the second light L2. The second absorbers ABS may absorb a portion of the second light L2 having a wavelength of about 550 nm to 650 nm. General absorbers may be used as the absorbers ABS. The absorbers ABS may include at least one of, for example, a tetraaza porphyrin (TAP) based compound, a rhodamine (RH) based compound, a squarine (SQ) based compound, or a cyanine (CY) based compound.

Referring to FIGS. 1 and 5B, the light absorbing sheet ASS may include a blocking prevention part ABP and a light absorbing part ASP. The blocking prevention part ABP may prevent a member (for example, a light guide plate or a diffusion plate) that is provided below the light absorbing sheet ASS from pressing against the light absorbing sheet ASS. The light absorbing part ASP may absorb a portion of the second light L2 having a wavelength of about 550 nm to about 650 nm. The light absorbing part ASP may be provided on the blocking prevention part ABP. The light absorbing part ASP may include the second resin RE2 and the absorbers ABS.

The blocking prevention part ABP may include a fifth resin RE5 and blocking preventers ABA.

A general resin may be used as the fifth resin RE5. The fifth resin may include, for example, a silicone resin or a photoresist resin. The fifth resin RE5 may include at least one of, for example a monomer or an oligomer.

The blocking preventers ABA may prevent a member (for example, a light guide plate or a diffusion plate) provided below an optical wavelength converter OU from pressing against the optical wavelength converter OU. General blocking preventers may be used as the blocking preventers ABA. For example, the blocking preventers ABA may include at least one of, for example, acrylic, polymethyl methacrylate (PMMA), polystyrene (PS), modified styrene (MS), polyurethane (PU), or silicone.

Referring to FIGS. 1 and 5C, the light absorbing sheet ASS may include a blocking prevention part ABP, a light absorbing part ASP, and a diffusion part DIFP. The blocking prevention part ABP may prevent a member (for example, a light guide plate or a diffusion plate) that is provided below the light absorbing sheet ASS from pressing against the light absorbing sheet ASS. The light absorbing part ASP may absorb a portion of the second light L2 having a wavelength of about 550 nm to about 650 nm. The diffusion part DIFP may be provided on the light absorbing part ASP. The diffusion part DIFP may diffuse light provided thereto.

The light absorbing part ASP may include the second resin RE2 and the absorbers ABS. The blocking prevention part ABP may include the fifth resin RE5 and the blocking preventers ABA. The diffusion part DIFP may include a fourth resin RE4 and diffusers DIA.

A general resin may be used as the fourth resin RE4. The fourth resin RE4 may include, for example, a silicone resin or a photoresist resin. The fourth resin RE4 may include at least one of, for example, a monomer or an oligomer.

The diffusers DIA may diffuse the light provided thereto. General diffusers DIA may be used as the diffusers DIA. The diffusers DIA may include at least one of, for example, acrylic, polymethyl methacrylate (PMMA), polystyrene (PS), modified styrene (MS), polyurethane (PU), or silicone.

By way of summation and review, general display devices including excitation light emitting bodies may exclude absorbers that absorb mixed light. Thus, a display quality may be reduced. For example, the display quality may be degraded by wavelengths in a range of about 550 nm to about 650 nm, in which red light and green light are mixed. Moreover, quantum dots used in general display devices as excitation light emitting bodies may include carcinogens such as Cd. Thus, such display devices may pose a risk of harm to the human body.

A display device according to an embodiment may include absorbers that absorb mixed light and thereby improve the display quality. For example, the absorbers included in the display device according to an embodiment may absorb the display quality-degrading light having a wavelength of about 550 nm to about 650 nm in which red light and green light are mixed.

Moreover, the display device according to an embodiment may exclude excitation light emitting bodies that are harmful to the human body. The display device according to an embodiment may include excitation light emitting bodies in a light guide plate or diffusion plate such that a separate optical wavelength converter including excitation light emitting bodies may be omitted, thereby slimming down the display device.

A display device according to an embodiment may improve display quality.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A display device, comprising:
a backlight; and
a display panel on the backlight, wherein the backlight includes:
a light source to provide a first light; and
an optical wavelength converter to receive the first light and emit a second light, the optical wavelength converter including:
a light emitting part having a plurality of excitation light emitting bodies to be excited by receiving the first light, and thereby emit the second light, and
a light absorbing part including a plurality of absorbers provided on the light emitting part to receive the second light and absorb a portion of the second light having a wavelength of about 550 nm to about 650 nm,
a diffusion part to diffuse light, the diffusion part being on the light absorbing part, and
wherein the optical wavelength converter is spaced from the light source.

2. The display device as claimed in claim 1, wherein:
the first light is a blue light; and
the excitation light emitting bodies include a red excitation light emitting body to receive the first light and emit a red light, and a green excitation light emitting body to receive the first light and emit a green light.

3. The display device as claimed in claim 1, wherein the excitation light emitting bodies include at least one of a boron-dipyrromethene based compound, a coumarin based compound, a rhodamine based compound, a perylene based compound, a nitride compound, or a silicate compound.

4. The display device as claimed in claim 1, wherein the absorbers include at least one of a tetraaza porphyrin based compound, a rhodamine based compound, a squarine based compound, or a cyanine based compound.

5. The display device as claimed in claim 1, wherein the optical wavelength converter further includes a base part between the light emitting part and the light absorbing part.

6. The display device as claimed in claim 1, wherein the optical wavelength converter further includes a blocking prevention part below the light emitting part.

7. The display device as claimed in claim 1, wherein the backlight further includes a light guide plate below the optical wavelength converter, the light source being on at least a side surface of the light guide plate.

8. The display device as claimed in claim 1, wherein the backlight further includes a diffusion plate below the optical wavelength converter, the light source being provided below the diffusion plate.

9. The display device as claimed in claim 1, wherein the backlight further includes an optical member between the optical wavelength converter and the display panel, the optical member including at least one of a prism sheet, a diffusion sheet, or a protective sheet.

10. A display device, comprising:
a backlight; and
a display panel on the backlight, the backlight including:
a light guide plate;
a light source on at least a side surface of the light guide plate, the light source to provide a first light to the light guide plate; and
a light absorbing sheet including a light absorbing part that includes a plurality of absorbers, and a diffusion part to diffuse light, the diffusion part being on the light absorbing part, wherein:
the light guide plate includes a plurality of excitation light emitting bodies to be excited by receiving the first light, and thereby emit a second light, and
the absorbers to receive the second light from the light guide plate and to absorb a portion of the second light having a wavelength of about 550 nm to about 650 nm.

11. The display device as claimed in claim 10, wherein the light absorbing sheet includes:
a blocking prevention part to prevent the light absorbing sheet from pressing against the light guide plate, wherein
the light absorbing part is on the blocking prevention part.

12. The display device as claimed in claim 10, wherein:
the first light is a blue light; and
the second light includes a red light and a green light.

13. A display device, comprising:
a backlight; and
a display panel provided on the backlight, wherein the backlight includes:
  a light source;
  a diffusion plate on the light source, the diffusion plate to receive a first light from the light source, the diffusion plate including a plurality of excitation light emitting bodies that are excited when the first light is incident thereon, and thereby emit a second light; and
  a light absorbing sheet having a plurality of absorbers to receive the second light from the diffusion plate and to absorb a portion of the second light having a wavelength of about 550 nm to about 650 nm, wherein the light absorbing sheet includes:
    a blocking prevention part that to prevent the light absorbing sheet from pressing against the diffusion plate; and
    a light absorbing part on the blocking prevention part, the light absorbing part including the absorbers.

14. The display device as claimed in claim 13, wherein the light absorbing sheet further includes a diffusion part to diffuse light, the diffusion part being on the light absorbing part.

* * * * *